No. 615,126. Patented Nov. 29, 1898.
J. G. W. & A. K. BAILEY.
CULTIVATOR.
(Application filed Sept. 3, 1898.)

(No Model.)

Witnesses
G. H. Walmsley.
George M. Richards

Inventors
Andrew K. Bailey &
Jason G. W. Bailey
By Davis & Davis Attorneys

UNITED STATES PATENT OFFICE.

JASON G. W. BAILEY AND ANDREW K. BAILEY, OF POPLAR CREEK, MISSISSIPPI.

CULTIVATOR.

SPECIFICATION forming part of Letters Patent No. 615,126, dated November 29, 1898.

Application filed September 3, 1898. Serial No. 690,160. (No model.)

*To all whom it may concern:*

Be it known that we, JASON G. W. BAILEY and ANDREW K. BAILEY, citizens of the United States, residing at Poplar Creek, in the county of Montgomery and State of Mississippi, have invented certain new and useful Improvements in Cultivators, of which the following is a specification, reference being had therein to the accompanying drawings, in which—

Figure 1:
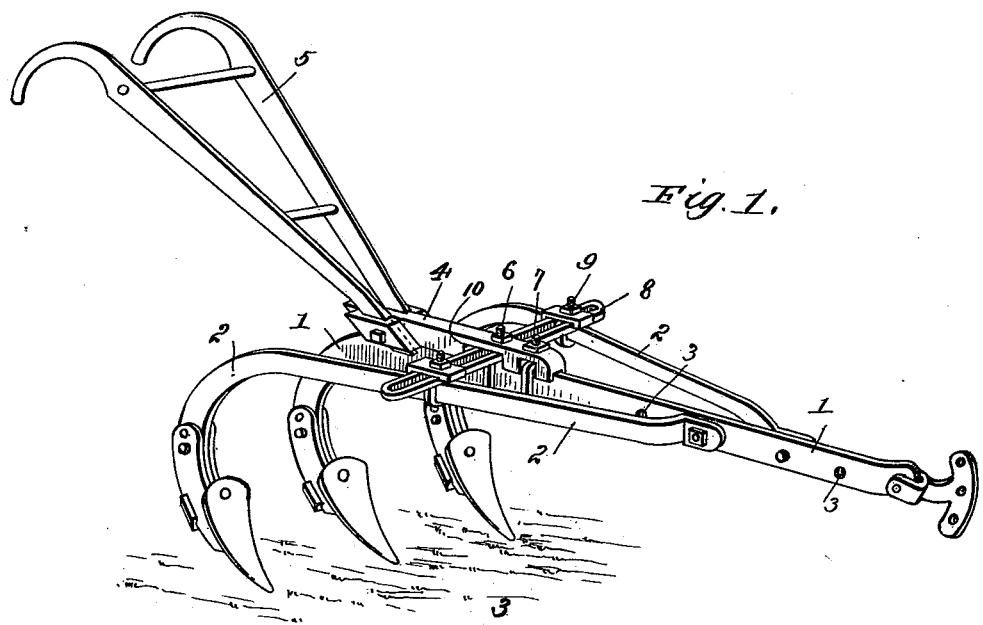
Figure 2:
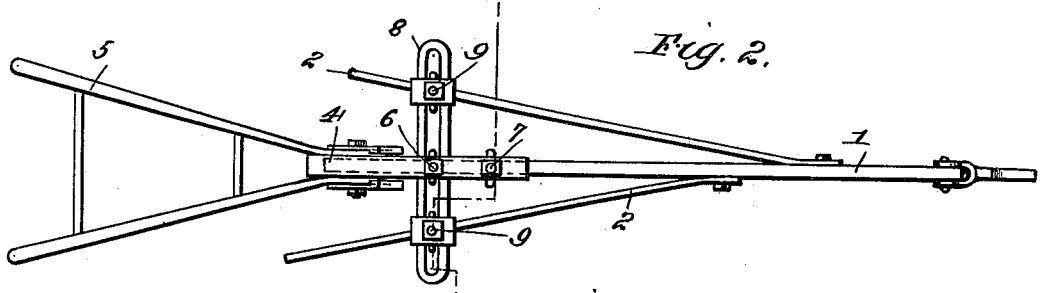
Figure 3:
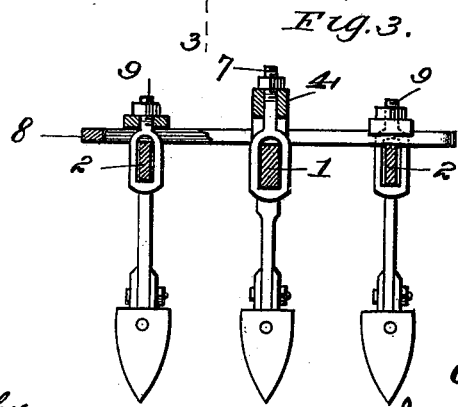

Figure 1 is a perspective view; Fig. 2, a plan view, and Fig. 3 a vertical sectional view on line 3 3 of Fig. 2.

The invention has for its object to provide improved means for adjusting the handles longitudinally and for securing the cultivator-beams in their various adjusted positions; and it consists in the novel combination and arrangement of parts hereinafter described, and particularly pointed out in the claims appended.

Referring to the various parts by numerals, 1 designates the main beam of the cultivator, and 2 designates the rearwardly-diverging side beams thereof. The main beam near its forward end is formed with a series of holes 3, through any one of which the bolts which secure the forward ends of the rearwardly-diverging side beams to the main beam are passed.

Secured adjustably to the upper edge of the main beam near its rear end is a longitudinal handle-carrying bar 4, to the rear end of which the handles are bolted. This bar 4 is secured to the beam 1 by means of two eyebolts 6 and 7. The main beam passes through the eyes of these bolts, and the shanks of said bolts pass upward through the bar. By means of nuts, which engage the shanks and are screwed down on the upper side of the bar 4, said bar is securely and adjustably held to the beam 1. Depending flanges are formed on the sides of this bar, and these flanges embrace the sides of the main beam and prevent any lateral movement of the bar on said beam.

Extending across the cultivator and resting on the tops of the beams 1 and 2 is a bar 8, which is slotted longitudinally. This bar is adjustably secured to the side beams by means of eyebolts 9, which pass through the slot in the bar, the said beams passing through the eyes of the bolts. This bar passes through a recess 10, formed in the bar 4, and the eyebolt 6 passes through the slot in said bar 8 and adjustably clamps said cross-bar to the beam 1.

The rear ends of the beams carry cultivating plows or teeth of any desired construction.

In operation the forward ends of the side beams may be secured to the main beam in such a position as to bring the cultivator-teeth carried by them either forward of or in the rear of the tooth carried by the main beam, or they may be so secured as to bring the tooth on either side of the main beam forward of or in the rear of the central tooth in order to adapt the machine for use in cultivating various kinds of crops and for working the crops at different times in their growth. In order to permit of these various adjustments and at the same time furnish simple means for tying the beams together at their rear ends, the slotted bar 4 is provided. As the side beams are moved forward or backward the bolts 9 are loosened and moved inward or outward, as found necessary, in order to secure the side beams in their proper position. By loosening bolts 6, 7, and 9 the bar 4, and with it bar 8, may be moved back and forth on the beams to secure the proper position of the handles on the cultivator in its various forms in order that the best control may be had over the machine.

Having thus fully described our invention, what we claim, and desire to secure by Letters Patent, is—

1. In a cultivator the combination of a main beam, side beams adjustably secured thereto, cultivator-teeth carried by said beams, a longitudinally-adjustable handle-carrying bar secured to the main beam and provided with depending flanges engaging the beam, thereby preventing lateral movement thereon, and a pair of handles secured to said bar.

2. In a cultivator the combination of a main beam, side beams secured thereto, cultivator-teeth carried by said beams, a longitudinally-adjustable handle-carrying bar secured to said main beam, means preventing lateral movement of said bar upon the beam and handles carried by said bar.

3. In a cultivator the combination of a main beam, rearwardly-diverging side beams adapted to be secured to the main beam at various points in its length, a cross-bar adapted to tie the side beams to the main beam and adjustable clamping means carried by said cross-bar and adapted to move inward or outward on said bar as the side beams are moved backward or forward on the main beam, and a handle-carrying bar longitudinally adjustable upon the upper side of the main beam and interlocked with said adjustable cross-bar.

4. In a cultivator the combination of a main beam, rearwardly-diverging side beams adapted to be secured to the main beam at various points in its length, a cross-bar, clamping means carried by said bar and clamping the side beams to said bar, said clamping means being adjustable on said cross-bar, a handle-carrying bar on the main beam and interlocked with the cross-bar, clamping means for longitudinally adjustably securing said bar to the main beam, said clamping means also securing the cross-bar to the main beam whereby the handle-carrying bar and the cross-bar are made adjustable together.

In testimony whereof we hereunto affix our signatures, in the presence of two witnesses, this 9th day of August, 1898.

J. G. W. BAILEY.
A. K. BAILEY.

Witnesses:
A. D. McCLELLAN,
J. T. PARKERSON.